May 16, 1939.  J. COPPOLA ET AL  2,158,175
BRAKE MECHANISM
Filed Oct. 28, 1936  3 Sheets-Sheet 1
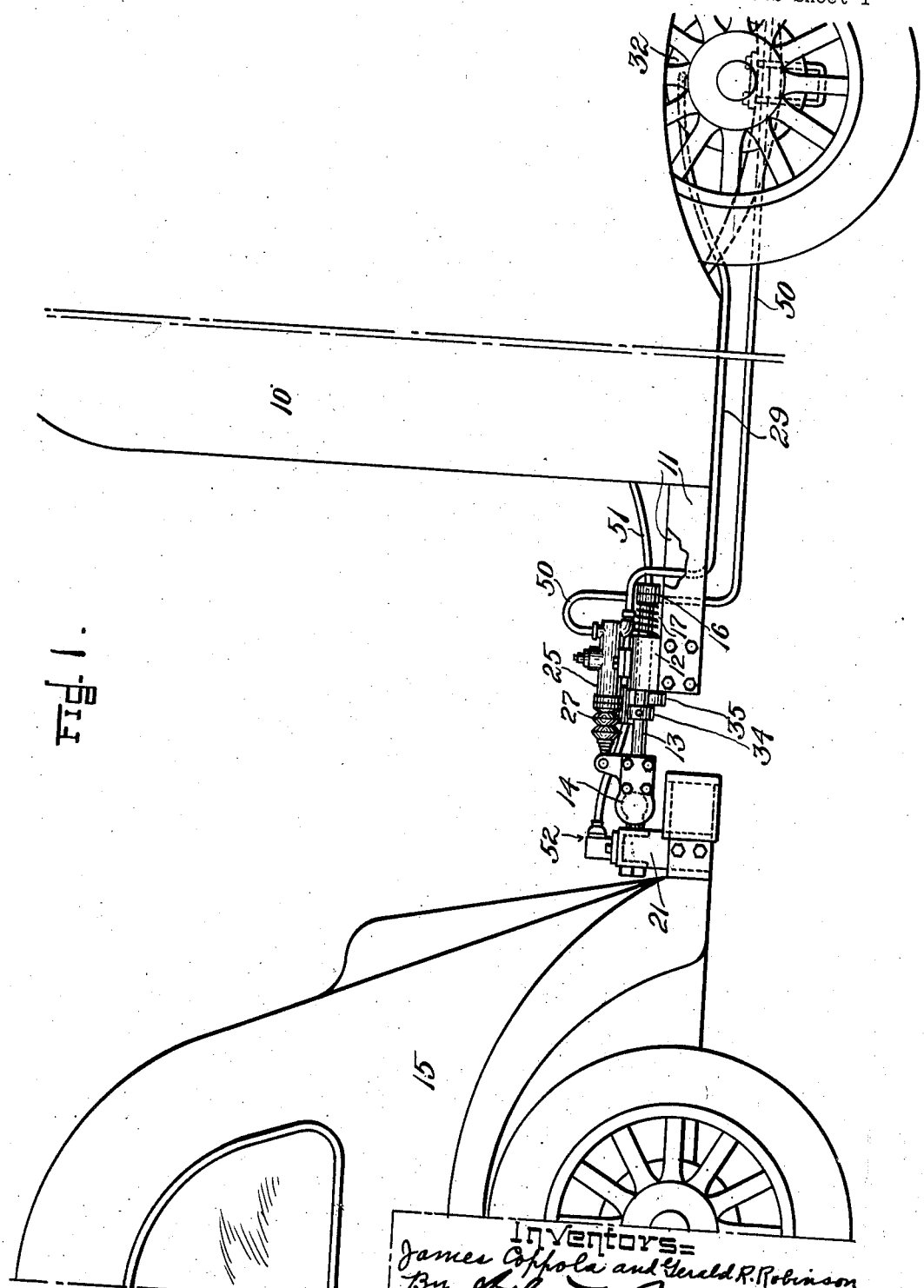

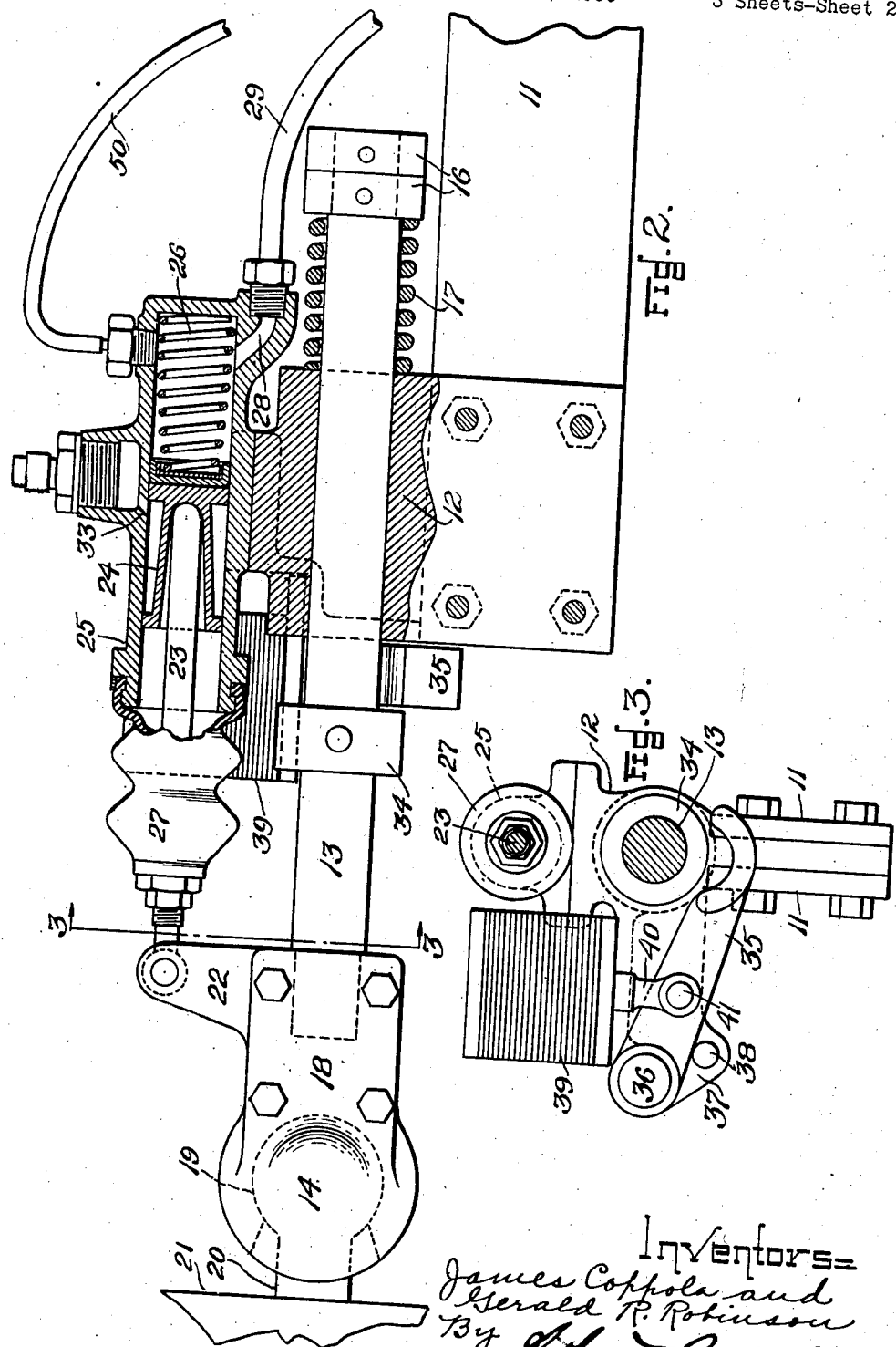

Patented May 16, 1939

2,158,175

UNITED STATES PATENT OFFICE 2,158,175

BRAKE MECHANISM

James Coppola and Gerald R. Robinson, Lynn, Mass.

Application October 28, 1936, Serial No. 108,056

1 Claim. (Cl. 188—112)

Our invention relates to brake mechanisms for vehicles and it has for its object to provide an improved inertia operated brake mechanism for trailer vehicles which will be automatically operated when the trailer and the pulling vehicle move relatively toward or from each other while traveling over a roadway.

Another object of the invention is to provide for the automatic control and operation of a stop signal disposed at or adjacent to the rear end of the trailer so that when the brake mechanism of the latter is automatically operated the signal will be simultaneously operated automatically also.

To these ends we have provided the improved brake mechanism and stop signal devices set forth in the following description, the several novel features of the invention being separately pointed out and defined in the claim at the close of the latter.

In the accompanying drawings:

Figure 1 is a side elevation of the adjacent end portions of a trailer and pulling vehicle equipped with an inertia operated trailer brake mechanism constructed in accordance with this invention.

Figure 2 is an elevation, partly in section, of the coupling connecting the two vehicles shown in Fig. 1 and including the force pump hereinafter referred to.

Figure 3 is a section on line 3—3 of Fig. 2.

Figure 4:
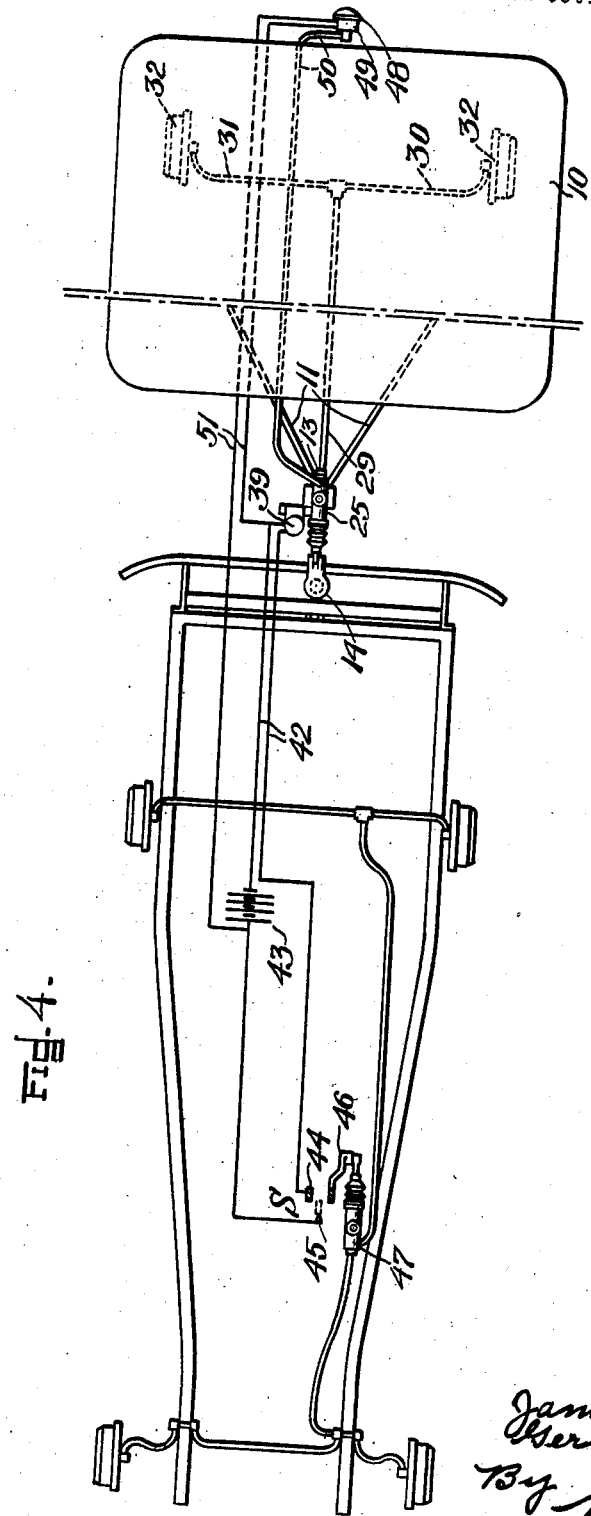
Figure 4 is a plan view, more or less diagrammatic, of the brake mechanism and stop signal devices of the vehicles shown in Fig. 1.

In the illustrated embodiment of our invention the frame of the trailer vehicle 10 includes a pair of forwardly extending and converging side bars 11, 11, and between the forward ends of the latter is fitted and fixed a block 12 having a hole formed therethrough within which is slidably mounted a draw-bar 13. The forward end of this draw-bar is connected by a universal joint 14 with the frame of the pulling vehicle 15.

At its rear end the draw-bar 13 is provided with a pair of abutment collars 16 between which and block 12 may be arranged a coiled spring 17 surrounding the draw-bar. This spring is desirable but not essential and if omitted the abutment collars 16 will be disposed to normally directly engage the block 12.

At its forward end the draw-bar is provided with a socket fixture 18 within which is rotatably confined a ball 19 provided at one end of a stem 20 rigidly fixed to a cross-bar 21 that is part of the frame of the pulling vehicle 15.

The socket fixture 18 is made with an upstanding arm 22 to the upper end of which is pivotally connected one end of a piston rod 23 whose opposite end is in abutting engagement with a piston 24 slidably arranged within a cylinder 25 that is fixed rigidly in position upon the top of the block 12.

A coiled spring 26 within cylinder 25 bears at its one end against one end of piston 24 to yieldingly hold the latter against the inner end of rod 23 and at its opposite end abuts an end wall or head of the cylinder.

The forward end of cylinder 25 is telescopically fitted into, and has fixedly attached to it, one end of a tubular flexible rubber bellows 27 which surrounds the piston rod 23 and has its forward end fixedly attached thereto. This bellows provides for endwise movement of the piston rod and at the same time prevents leakage from the cylinder.

At its rear end the cylinder 25 is made with a port 28 connected by conduits 29—30 and 29—31, Fig. 4, with hydraulically operated brakes 32, of usual construction, with which the wheels of the trailer 10 are provided. The part of cylinder 25 that is occupied by the coiled spring 26 and conduits 29—30 and 29—31 are filled with oil supplied thereto through a port 33 which communicates with a reserve supply. Therefore, it will be clear that when the trailer 10 moves forwardly relatively to the pulling vehicle 15 while said two vehicles are traveling over a roadway, the forward movement of the cylinder 25 relatively to piston 24 and rod 23 forces oil through port 28 thereby applying the brakes 32. It will also be clear that the return movement of cylinder 25 accompanying a rearward movement of the trailer relatively to the pulling vehicle results in a reverse movement of the oil which unsets the brakes.

A collar 34 fixed on draw bar 13 in front of block 12 serves, through engagement with the latter, to limit the forward movement of the trailer relatively to the draw-bar and pulling vehicle.

In order to prevent backing up movement of the vehicle 15 from setting the hydraulic brake mechanism of the trailer when this is desired a normally inoperative abutment or stop member 35 is provided adjacent to the collar 34. This stop member is pivotally mounted at 36, Fig. 3, on an arm 37 projecting laterally from one side of block 12 of which it is part and normally rests by gravity upon a stud 38 projecting from said arm. When resting upon stud 38 the free end of member 35 is below the path of collar 34 and the latter is free to move rearwardly with drawbar 13 as far as block 12. It will be clear, however, that when member 35 is swung upwardly into position against bar 13 it occupies a position between block 12 and collar 34 and serves to prevent rearward movement of draw-bar 13 relatively to the trailer so that the hydraulic brakes of the trailer will not be set when vehicle 15 is backed up while stop member 35 occupies its elevated position.

On the arm 37 is also fixed the coil 39 of a solenoid whose core 40 is pivotally connected at 41 to the pivoted stop member 35. When coil 39 is energized its core 40 raises member 35 until the free end of the latter is against shaft 13 and occupies a position between collar 34 and block 12 thereby preventing rearward movement of draw-bar 13 relatively to block 12 when vehicle 15 is backed.

Coil 39 is arranged in a circuit 42, Fig. 4, in series with the usual battery 43 of vehicle 15 and also in series with a normally open make-and-break switch S the movable member 44 of which may, as herein contemplated, be the gear-shift lever of said vehicle. When this lever is swung from its neutral position shown in Fig. 4, sidewise and then forwardly into the position indicated by dotted lines to throw the transmission of the vehicle into reverse, it engages a stationarily supported contact 45 thereby closing the circuit 42 and energizing coil 39 preparatory to backing vehicle 15. When lever 44 is shifted out of position for reverse drive of course circuit 42 is opened and stop 35 falls into its inoperative position.

Alongside of the gear-shift lever 44 is shown the usual foot-brake lever 46 connected with the piston of a pump 47 that is part of the hydraulic brake system of vehicle 15.

At its rear end the trailer 10 is provided with an electric "stop" signal lamp 48 constructed with a normally open pressure operated make-and-break switch mechanism 49 connected by a conduit 50 with the rear end portion of the interior of cylinder 25. This lamp with its switch mechanism may be constructed as usual in the case of hydraulically operated stop lamps now in use on automobiles.

Lamp 48 and switch mechanism 49 are arranged in series in a circuit 51 together with battery 43 and it will be clear that when the two vehicles are traveling over a roadway and when the brakes are applied to vehicle 15, the trailer moves forwardly relatively to draw-bar 13 causing the piston 24 to act through the oil within cylinder 25 and conduit 50 automatically to close the switch of lamp 48 which results in illumination of the latter. It will be understood that while the trailer is being pulled forward by draw-bar 13, the switch of lamp 48 is open and the latter is not illuminated Part of the circuit 51 is mounted upon the trailer 10 while the battery 43 and other part of said circuit is mounted upon the pulling vehicle 15. Therefore this circuit may include a separable connector or plug and socket such as that shown at 52 in Fig. 1 but which is omitted from Fig. 4. In practice a similar connector or plug and socket may be provided in the circuit 42 so that the portion thereof connected with the trailer may be separated from the portion thereof mounted on the pulling vehicle 15.

What we claim is:

In combination, a motor propelled pulling vehicle provided with a gear-shift member; a trailer vehicle; brake mechanism for said trailer vehicle; means coupling the forward end of said trailer vehicle to the rear end of said pulling vehicle with provision for relative fore and aft movement of said vehicles to a limited extent; means automatically operated by forward movement of the trailer vehicle relatively to the pulling vehicle for setting the brakes of said trailer vehicle; a normally inoperative device that is adjustable into an operative position where it holds the said vehicles against relative movement toward each other; an electro-magnet for adjusting said device into its operative position, an electric circuit in which said device is arranged, and switch means controlled by the gear-shift member of said pulling vehicle for energizing said magnet thereby to render said device operative to hold said vehicles against brake-setting relative movement toward each other when said gear shift member is thrown into reverse drive position.

JAMES COPPOLA.
GERALD R. ROBINSON.